United States Patent Office 3,342,604
Patented Sept. 19, 1967

3,342,604
NON-SILVER PHOTOSENSITIVE PRINTOUT COMPOSITIONS
Robert H. Sprague, Chagrin Falls, John A. Stewart, Parma, and James M. Lewis, Cleveland, Ohio, assignors to Horizons Incorporated, a corporation of New Jersey
No Drawing. Filed Sept. 28, 1964, Ser. No. 399,892
12 Claims. (Cl. 96—90)

ABSTRACT OF THE DISCLOSURE

Non-silver photosensitive compositions which printout an image directly as a result of exposure to visible light and containing the following, in admixture: (1) a suitable color forming leuco-compound; (2) a styryl dye base or a cyanine dye base; (3) an organic halogen compound; and (4) a non-toxic colorless organic sulfur containing compound.

This invention relates to non-silver photosensitive compositions which printout an image directly upon exposure to a suitable dosage of visible light. More particularly it relates to photosensitive compositions consisting essentially of at least one of each of the following classes of compounds:
 (1) A suitable color forming leuco compound;
 (2) A styryl dye base or a cyanine dye base;
 (3) An organic halogen compound; and
 (4) A non-toxic colorless organic sulfur-containing compound.

(1) The leuco compounds

The leuco compounds suitable for the photosensitive compositions of this invention are described in copending United States patent applications Ser. Nos. 270,551 filed Apr. 4, 1963 and issued Nov. 15, 1966, as United States Patent 3,285,744 and 395,903 filed Sept. 11, 1964, by R. H. Sprague et al., the disclosures of which are incorporated herein by reference.

These compounds are represented by the following general formulas

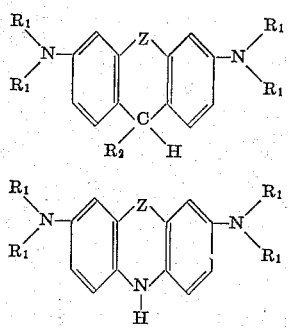

in which Z is >O, >S, >Se, or

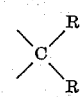

$R_1$ is H, lower alkyl or aryl; and $R_2$ is H, alkyl or aryl including

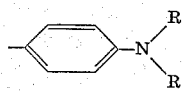

(2) The dye bases

The dye bases which provided enhanced speed and density and which cause a shift in the hue of the printout image towards the blue in some instances are the styryl dye bases and cyanine dye bases described in United States Patent 3,102,810 issued Sept. 3, 1963, and particularly those exemplified in the examples which follow.

These dye bases are represented by the following general formulas:

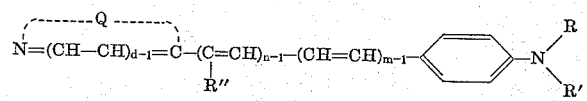

wherein R and R′ represent monovalent radicals selected from the group consisting of lower alkyl (i.e., methyl, ethyl, n-propyl) and benzyl, and may be the same as one another or different from one another; R″ represents a monovalent radical selected from the group consisting of H and —CN; $d$ and $n$ each represents a positive integer which is either 1 or 2; $m$ is a positive integer not greater than 4; and the sum of $n-1$ and $m-1$ is not greater than 4; and Q represents the nonmetallic atoms necessary to complete a heterocyclic nucleus (i.e., the atoms of C, O, S, Se, and N) necessary to complete heterocyclic compounds such as those in United States Patent 3,102,810.

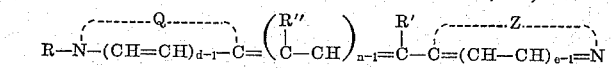

wherein $d$ and $e$ each represents a positive integer of from 1 to 2; $n$ represents a positive integer of from 1 to 4; R represents an organic radical selected from the group consisting of alkyl, aralkyl and aryl groups; R′ represents hydrogen or a cyano group; R″ represents H or alkyl; and Q and Z each represents the nonmetallic atoms necessary to complete a heterocyclic organic nucleus containing from 5 to 6 atoms in the ring.

(3) The activators

The organic halogen compounds and non-toxic sulfur containing compounds activate the leuco-xanthene or leuco-anthracene compounds as described in the above copending applications.

Suitable organic halogen compounds in the present photosensitive compositions are those represented by the general formula A—C—X$_3$ wherein A represents a member selected from the group consisting of alkyl, aryl, aroyl, aralkyl, haloalkyl, H, Cl and Br and X is Br or Cl.

Carbon tetrabromide is a particularly preferred organic halogen compound in this invention. The oganic halogen compounds should be present in the photosensitive compositions of this invention in amounts between about 5 and 50 parts by weight for each part by weight of leuco-xanthene or leuco-anthracene compound.

Suitable organic sulfur compounds are those selected from the group consisting of:
R is a heterocyclic nucleus of the type commonly used
 (1) Mercapto compounds of the type R—S—H wherein R is a heterocyclic nucleus of the type commonly used in cyanine dye chemistry (as in the above noted patent);
 (2) Disulfides of the type R—S—S—R wherein R has the same meaning as in 1 above;
 (3) Disulfides of the general formula

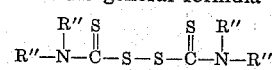

wherein R″ is selected from the group consisting of H, lower alkyl and aryl;
 (4) Cyclic sulfur compounds wherein the sulfur is attached to a carbon atom in a heterocyclic ring wherein the same carbon atom is attached to two non-carbon atoms e.g. as in rhodanine or tetrazole;
 (5) Thiourea and substituted thioureas;
 (6) Acyclic thioacetanilides; and
 (7) Rhodanines.

The non-toxic colorless sulfur containing organic compound is preferably present in the photosensitive compositions of this invention in amounts between 0.1 and 10 parts by weight for each part by weight of leuco-xanthene or leuco-anthracene compound.

The invention will be better understood from a consideration of the data presented in the following table, in which the results obtained by exposing mixtures consisting of the leuco compound and activators are contrasted with the results obtained by exposing similar mixtures containing in addition a small amount of a suitable dye base.

In each instance a binder solution of cellulose acetate butyrate in acetone and benzene was formulated and to this the carbon tetrabromide and 2-mercaptobenzothiazole were added. Then, when it was present, the dye base was added. The formulations described in the examples which follow comprised the following:

Acetone _____ cc__ 2
Benzene _____ cc__ 2
Cellulose acetate butyrate _____ mg__ 100
Leuco compound _____ mg__ 100
$CBr_4$ _____ mg__ 700
2-mercaptobenzothiazole _____ mg__ 25
Dye base (when present) _____ mg__ 100

The resulting mixture was coated as a 0.003 inch wet coating thickness on sheets of type 302–T Mylar (polyethyleneterephthalate). After the coating was permitted to dry, it was then exposed for 1 minute to illumination from one photoflood lamp at a distance of 12 inches lamp to film, through a step tablet with red, green and blue filters. The resulting densities and number of steps visible is reported below:

| Example | Leuco Compound | Dye base |
|---|---|---|
| 1 | 3,6-bis (dimethylamino)-9-p-dimethylamino-phenyl-xanthene. | None. |
| 2 | As in 1 above | 4-[3-(3-ethyl-2(3H) benzo-thiazolylidene) propenyl] quinoline. |
| 3 | ___do___ | 4-(3-ethyl-2(3H)-benzothia-zolylidene)-methyl-quinoline. |
| 4 | 2,7-bis (dimethylamino)-9,10-dihydro-9,9-dimethyl-anthracene. | None. |
| 5 | As in 4 above | As in 2 above. |
| 6 | 2,7-bis (dimethylamino) 10-p-dimethylaminophenyl-9,10-dihydro-9,9-dimethyl anthracene. | Noen. |
| 7 | As in 6 above | As in 2 above. |
| 8 | ___do___ | Do. |
| 9 | Leuco Crystal Violet | None. |
| 10 | ___do___ | 4-(p-dimethylaminostyryl) quinoline. |

| Example | Base plus Fog | Clear | | | Red | | | Green | | | Blue | | | Image Hue |
|---|---|---|---|---|---|---|---|---|---|---|---|---|---|---|
| | | No. Steps | Gross | Net | No. Steps | Gross | Net | No. Steps | Gross | Net | No. Steps | Gross | Net | |
| 1 | 0.34 | 21 | 3+ | 2.66 | 11 | 2.94 | 2.60 | 18 | 1.77 | 1.43 | 16 | 2.81 | 2.47 | Magenta. |
| 2 | 0.12 | 21 | 3+ | 2.88 | 21 | 2.93 | 2.81 | 21 | 3+ | 2.88 | 21 | 2.86 | 2.74 | Blue. |
| 3 | 0.21 | 21 | 3+ | 2.84 | 13 | 3+ | 2.84 | 21 | 2.6 | 2.44 | 21 | 3+ | 2.84 | Reddish Orange. |
| 4 | 0.06 | 21 | 3+ | 2.94 | 15 | 1.08 | 1.02 | 11 | 1.06 | 1.00 | 15 | 1.46 | 1.40 | Blue. |
| 5 | 0.16 | 21 | 3+ | 2.84 | 21 | 2.70 | 2.54 | 20 | 2.35 | 2.19 | 16 | 2.54 | 2.38 | Do. |
| 6 | 0.06 | 18 | 1.55 | 1.49 | 12 | 1.25 | 1.19 | 9 | 1.27 | 1.21 | 12 | 0.66 | 0.60 | Do. |
| 7 | 0.08 | 21 | 1.69 | 1.61 | 21 | 1.56 | 1.48 | 21 | 1.46 | 1.38 | 16 | 1.23 | 1.17 | Do. |
| 8 | 0.07 | 21 | 1.52 | 1.45 | 21 | 1.55 | 1.48 | 19 | 1.44 | 1.39 | 16 | 1.31 | 1.24 | Do. |
| 9 | 0.05 | 13 | 1.00 | 0.95 | 6 | 0.85 | 0.79 | 5 | 0.24 | 0.19 | 8 | 0.25 | 0.20 | Do. |
| 10 | 0.05 | 17 | 1.76 | 1.71 | 9 | 1.86 | 1.81 | 11 | 1.01 | 0.96 | 10 | 0.71 | 0.66 | Do. |

It will be seen that with the dye base present the density was enhanced and the image was shifted toward the blue, a more pleasing color for printed copy.

Instead of including a binder in the sensitive composition, the composition without binder can be applied to an absorbent porous substrate such as paper.

Other binders which have been found to be useful in the compositions of the present invention include:
Ethyl cellulose in ethanol,
Nitrocellulose in methanol,
Polystyrene in benzene,
Polyvinylidene chloride copolymer in methyl ethyl ketone,
Polyvinylchloride in tetrahydrofuran.

It will be evident that other compatible and chemically inert binders may be used in place of those listed above without departing from the scope of the invention.

Having now described the invention it is not intended that it be limited except as required by the appended claims.

We claim:
1. A non-silver composition which prints out a visible image directly as a result of exposure to visible light said composition consisting essentially of
  a leuco compound represented by the general formula

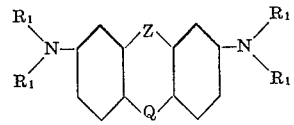

wherein each $R_1$ is selected from the group consisting of H, lower alkyl, and aryl, and the several $R_1$'s need not all be the same; Z is selected from the group consisting of $>O$, $>S$, $>Se$ and

wherein R represents H or alkyl; and Q is selected from the group consisting of

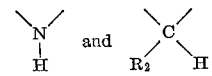

wherein $R_2$ is H, alkyl or aryl;
an activator consisting of (a) at least one organic halogen compound represented by the general formula $A-C-X_3$ wherein A represents a monovalent radical selected from the group consisting of H, Cl, Br, unsubstituted alkyl, substituted alkyl (particularly haloalkyl), aralkyl, unsubstituted aryl, substituted aryl, and aroyl; and each X is a halogen atom selected from the group consisting of Cl and Br and (b) at least one organic sulfur compound selected from the group consisting of:
  (1) mercapto compounds represented by the formula R—S—H wherein R is a heterocyclic nucleus represented by the formula commonly used in cyanine dye chemistry;
  (2) disulfides of the type R—S—S—R wherein R has the same meaning as in 1 above;
  (3) disulfides of the general formula

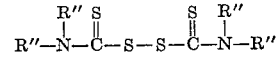

wherein R" is selected from the group consisting of H, lower alkyl and aryl;
(4) sulfides wherein the sulfide is attached to a carbon atom in a heterocyclic ring wherein the same carbon atom is attached to two non-carbon atoms;
(5) thiourea and substituted thioureas;
(6) acyclic thioacetanilides; and
(7) rhodanines;

and a dye base selected from the group consisting of styryl dye bases and cyanine dye bases.

2. The composition of claim 1 wherein the leuco compound is a leuco-xanthene.

3. The composition of claim 1 wherein the organic halogen compound is $CBr_4$.

4. The composition of claim 1 wherein the organic sulfur compound is a heterocyclic compound in which a mercapto group is attached to the number 2 carbon in the heterocyclic nucleus.

5. The composition of claim 3 wherein the mercapto compound is 2-mercaptobenzothiazole.

6. The composition of claim 1 wherein the styryl dye base is 4-p-dimethylamino styryl quinoline.

7. The composition of claim 1 wherein the cyanine dye base is 4-[3-(3-ethyl-2(3H) - benzothiazolylidene)-propenyl]quinoline.

8. A dry film consisting of the composition of claim 1 dispersed in a thin layer on an inert support.

9. The film of claim 8 wherein the support is a film forming plastic.

10. The film of claim 8 wherein the thin layer contains a cellulose compound selected from the group consisting of cellulose and cellulose derivatives as a binder for the constituents in the mixture.

11. The film of claim 8 wherein the support is transparent.

12. The process of producing a direct print-out image from originally colorless compounds which comprises preparing the composition of claim 1 in the form of a thin layer, exposing said layer to a pattern of visible light whereby a visible image prints out directly as a result of said exposure.

References Cited

UNITED STATES PATENTS 3,102,810  9/1963  Sprague et al. _____ 96—90

NORMAN G. TORCHIN, *Primary Examiner.*

C. E. DAVIS, *Assistant Examiner.*